United States Patent [19]

Venturino

[11] Patent Number: 5,048,115

[45] Date of Patent: Sep. 10, 1991

[54] SPEED CONTROL UNIT FOR DIRECT CURRENT ELECTRIC MOTOR WITH INTRINSIC FEED-BACK

[75] Inventor: Gianfranco Venturino, Milan, Italy

[73] Assignee: GSE Di Venturino Gianfranco, Milan, Italy

[21] Appl. No.: 313,975

[22] PCT Filed: Jul. 20, 1987

[86] PCT No.: PCT/IT87/00073

§ 371 Date: Feb. 23, 1989

§ 102(e) Date: Feb. 23, 1989

[87] PCT Pub. No.: WO88/00771

PCT Pub. Date: Jan. 28, 1988

[30] Foreign Application Priority Data

Jul. 21, 1986 [IT] Italy ............... 21195 A/86

[51] Int. Cl.$^5$ .............................................. H02P 5/00
[52] U.S. Cl. ................................. 388/815; 388/812; 388/809
[58] Field of Search .............. 388/801, 803–806, 388/809–815, 817–822, 908, 910; 318/676, 145

[56] References Cited

U.S. PATENT DOCUMENTS

| | | | |
|---|---|---|---|
| 2,814,768 | 11/1957 | Kinkel | 318/676 |
| 3,974,428 | 4/1974 | Hafle | 388/812 |
| 3,999,111 | 11/1975 | Bailey | 388/801 |
| 4,104,570 | 10/1976 | Hamby et al. | 388/813 |
| 4,121,142 | 7/1977 | Morser et al. | 388/830 |
| 4,177,412 | 12/1977 | Minakuchi | 388/819 |
| 4,241,299 | 12/1980 | Bertone | 318/474 |
| 4,449,081 | 1/1983 | Doeman | 388/822 |
| 4,622,500 | 7/1985 | Budelman | 388/814 |
| 4,768,389 | 2/1986 | Nakakuki | 388/817 |

FOREIGN PATENT DOCUMENTS

| | | |
|---|---|---|
| 690513 | 7/1964 | Canada . |
| 01372484 | 4/1985 | European Pat. Off. . |
| 0177683 | 4/1986 | European Pat. Off. . |
| 0055988 | 7/1987 | European Pat. Off. . |

OTHER PUBLICATIONS

"Simple Resistor Network Eliminated DC Tachometer", *Electronic Design*, No. 26, Dec. 19, 1968, By M. Kanner, pp. 100 and 102.

"Thyristorgespeiste Fordermaschinen", *BBC-Nachrichten*, No. 4, 1976, By V. Mittenzwei et al., pp. 153–160.

*Primary Examiner*—William M. Shoop, Jr.
*Assistant Examiner*—David Martin
*Attorney, Agent, or Firm*—Young & Thompson

[57] ABSTRACT

It is foreseen to measure the rotational speed (V) of a motor (4) by measuring the electromotive force (e.m.f.) This e.m.f. is calculated as the difference between the terminal voltage (Va) and the voltage drop at a reference resistor (S), through which the armature current flows, then this value is used as a velocity feedback signal for motor regulation. Particularly, the terminal voltage (Va) is cyclically measured at two successive close instants (t1, t2), during which the armature resistance (Ri) and the motor e.m.f. can be considered constant; these terminal voltage values ($V_{at1}$, $V_{at2}$) are stored, then elaborated to perform the actual armature resistance (Ri) during that interval (t1−t2), then this value is multiplied for the instant current (I). The result is then substracted from the terminal voltage (Va) and only at that time the resulting e.m.f. is used as a velocity feedback signal for the velocity feedback circuit. The apparatus for carrying out this process is also disclosed.

9 Claims, 4 Drawing Sheets

SPEED CONTROL UNIT FOR DIRECT CURRENT ELECTRIC MOTOR WITH INTRINSIC FEED-BACK

The present invention relates to controlling devices for direct current electric motors. There are some known feeding devices for direct current motors that comprise means for measuring the rotational speed of the motor, such as dynamo-speedometers or encoders mechanically connected to the rotating organ whose speed of rotation one wants to measure. They are connected to a voltmeter indicator or to a recorder, on which the rotational speed is read; the said measuring means can furthermore be connected to one or more relays so as to obtain the stabilisation of the rotational speed of the motor, according to prefixed values.

These measuring means, however entail some disadvantages such as the presence of additional moments of inertia on the driving shaft, with consequent decrease in the maximum angular accelerations, increased weight and overall size of the motor, greater construction and maintenance costs of the motor.

Control devices for d.c. motors are known, employing the e.m.f. as a control parameter, as the motor speed is proportional to it. In particular, in ELECTRONIC DESIGN, Vol. 16 of 12.19.66, pages 100, 102, a method is disclosed, by which the e.m.f. is obtained from the well-known relationship:

$$e.m.f. = V - RI$$

The above-cited document, however, uses the so-calculated e.m.f., assuming that it is correct. This bears substantial drawbacks, as:
- the armature resistance Ra variation according to temperature variation is not taken into account; this variation can instead be remarkable (having an order of 0.4%/°C.);
- commutator and brushes resistances are neglected; these resistances are also considerably non linear, so rendering non linear also the variation of Ra.

A d.c. motor speed control device is also known from EP-A-55988, where is foreseen to feed the motor with current pulses, by measuring the e.m.f. during pulse intervals. The drawback associated with this device is that this method of operation disturbs the motor and, moreover, it does not take into account transients, that is the induced currents that flow in the motor while feeding is interrupted.

Aim of the present invention is therefore to obtain a d.c. motor speed control unit capable of overcoming the above-mentioned drawbacks, that is, a unit:
a) allowing the calculation of the actual motor e.m.f. during its operation, by taking into account the Ra variations according to correspondent temperature and time variations;
b) not introducing any disturbance factor in motor operation.

Such aim is attained by calculating the motor e.m.f. as the difference between the terminal voltage and the voltage drop at a reference resistor through which the armature current flows; then this value is used as a velocity feedback signal for the motor regulation. In particular, the terminal voltage is cyclically measured at two successive close instants during which the armature resistance and the motor e.m.f. can be considered constant; these terminal voltage values are stored, then elaborated to perform the actual armature resistance during that interval, then this value is multiplied for the instant current. The result is then subtracted from the terminal voltage and only at that time the resulting e.m.f. is used as a velocity feedback signal for the velocity feedback circuit.

The unit for carrying out such a process comprises a resistance through which the armature current flows, a resistive divider for measuring the armature voltage, so that a feedback signal can be sent to the control circuit which also comprises a means for storing a reference speed, an adder for comparing this reference value with the feedback value, an amplifier for amplifying the difference between the two values which is used to operate the speed control unit. In particular, the velocity feedback signal is caused to pass through a logic unit before being sent to the control circuit. The logic unit is capable to store the values obtained at two successive close instants during which the armature resistance and the motor e.m.f. can be considered constant, in order to obtain the armature resistance by performing the two equations e.m.f. = V − RI and multiplying this value for the instance current, then subtracting the result from the terminal voltage. Then this corrected signal is sent to the speed control circuit.

According to a first embodiment of the present invention, the electromotive force (e.m.f.) is obtained from the equation:

$$e.m.f. = Va - Ri \times I$$

where Va is the voltage measured at the terminals, Ri is the armature resistance of the motor and I is the absorbed current. Since armature resistance Ri can vary with the temperature, it is preferably calculated by using the following equations:

$$e.m.f. = Va_{t1} - Ri \times I_{t1}$$

$$e.m.f. = Va_{t2} - Ri \times I_{t2}$$

where t1 and t2 are two instants of measurement, close to each other. In the time interval (t1−t2) both the armature resistance (Ri) and the electromotive force (e.m.f.) are assumed constant; the absorbed current I, instead, varies due to couple variations and to rotor commutation. It is now possible to obtain Ri and then the e.m.f. from the equation e.m.f. = Va − Ri × I. A closed loop regulation of the motor is then carried out in the known way.

The circuit is equipped for this purpose with a voltage amplifier, with an element for carrying out the calculation of armature resistance Ri in a short time interval (t1−t2), with an element carrying out the product between Ri and I and the consequent difference Va − Ri × I, with an element for comparing the electromotive force with the obtained force, and with an error amplifier that amplifies the difference between the two electromotive forces, and acts on the motor controls.

According to a second embodiment of the present invention, a variable feeder is inserted in the circuit, producing a cyclically variable voltage term, which is superimposed to the direct voltage term feeding the motor. The amplitude of this voltage cycle must be such as to include the actual value of the e.m.f. of the motor. Consequently, the absorbed current I reaches the zero value almost twice in every cycle. The e.m.f. measurement is then carried out in the instants in which the current reaches the zero value, with no need for disconnecting the motor feeding circuit.

By inserting a current intensity meter and a comparator into the feeding circuit, the instants in which the current reaches the zero value are easily detected and the exact value of the e.m.f., equal to the value of the voltage delivered by the feeder in the same instants, can be known.

The e.m.f. value, obtained as above said, can be used for the same purposes of speed control shown in the previous embodiments.

The advantages of the last embodiment are mainly due to the lack of discontinuity in the motor feeding voltage and they include:

almost complete cancellation of radio-electric interferences produced by the feeding circuit, due to the lack of steep edges in motor absorbed current;

better exploitation of motor windings, due to the fact that the time intervals during which the current does not flow through them can be reduced as desired, independently from the motor speed; this advantage is essential to those motors that must develop the maximum torque at low speeds;

capability of the power line to recover the motor braking energy, due to the uninterrupted connection between the motor and the feeding system;

the intrinsic characteristics of the cyclically variable voltage feeder easily allow the generation of bipolar voltages, thus rendering advantageous the use of this feeder for bidirectional reversible motors;

capability to set the amplitude of the cyclically variable voltage term as low as desired, so limiting the instantaneous angular acceleration to values consistent with the motor application.

According to a further improvement of this last embodiment, only the above detailed e.m.f. and speed measurement and visualisation apparatus is realized and it is applied to a direct current motor having its own feeder and its own speed control system. It is however necessary that the feeding voltage is variable (e.g., generated by a rectifying bridge) and that the e.m.f. value is comprised within the voltage variation amplitude, so that the absorbed current (I) reaches, in some instants, the zero value.

Preferred exemplary embodiments of the present invention are illustrated in the appended drawings, in which.

Figure 1:
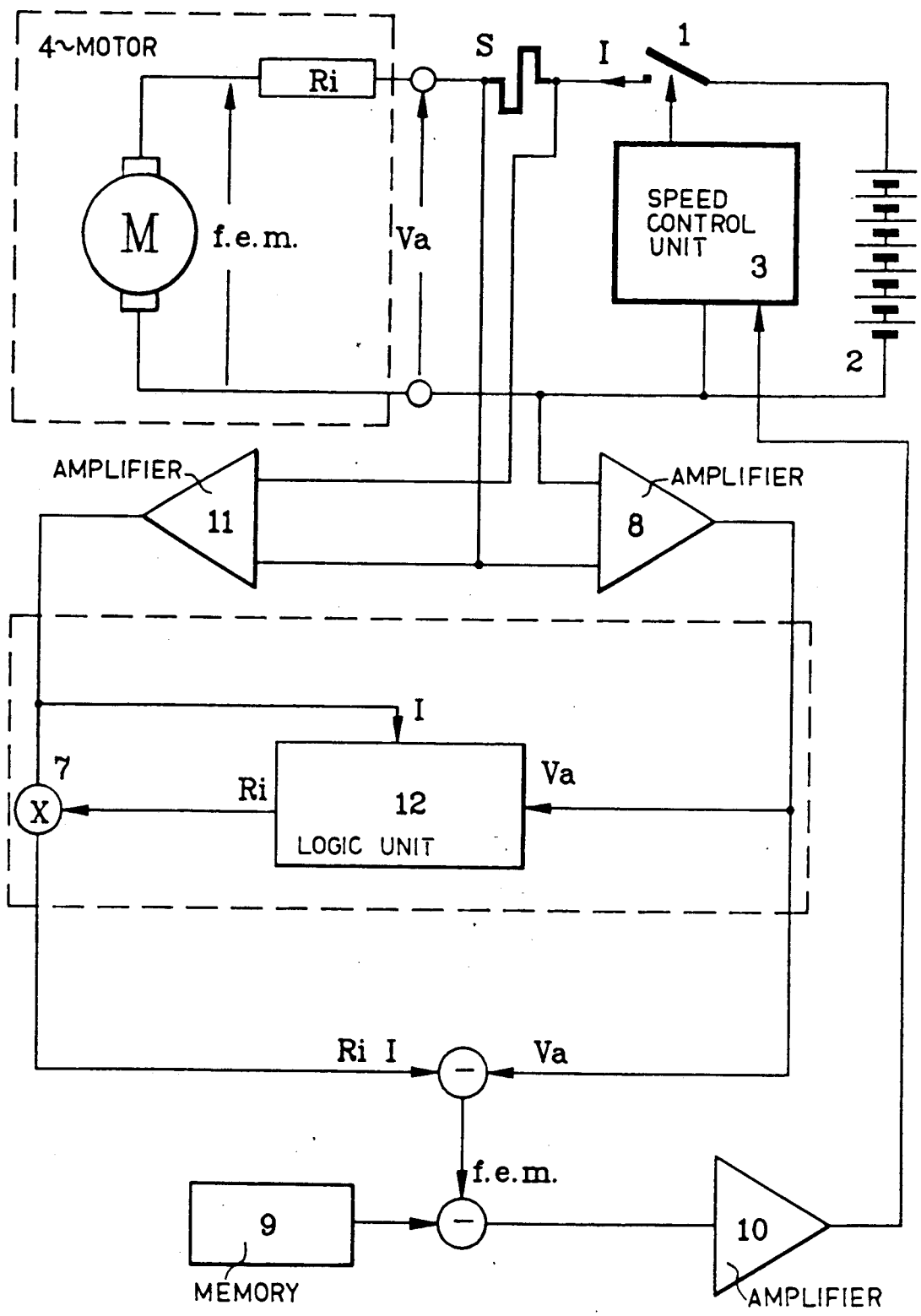
FIG. 1 shows an electric circuit according to a first embodiment.

FIG. 1 shows motor 4, having armature resistance Ri connected to supply 2 and to control unit 3 by means of switch 1. Within this circuit another circuit is paralleled; this comprises a voltage amplifier 8, an element 12 for the calculation of armature resistance Ri, a multiplier 7 that carries out the product $Ri \times I$ and a memory 9. The latter stores the value of the reference e.m.f. that is compared with the value of the e.m.f. found by calculating the difference between the voltage Va and the armature voltage drop. The difference between the two electromotive forces is amplified by amplifier 10 that acts on control unit 3. The value I of current is taken at the terminals of shunt S, then it is amplified in amplifier 11 and sent to multiplier 7.

Figure 2:
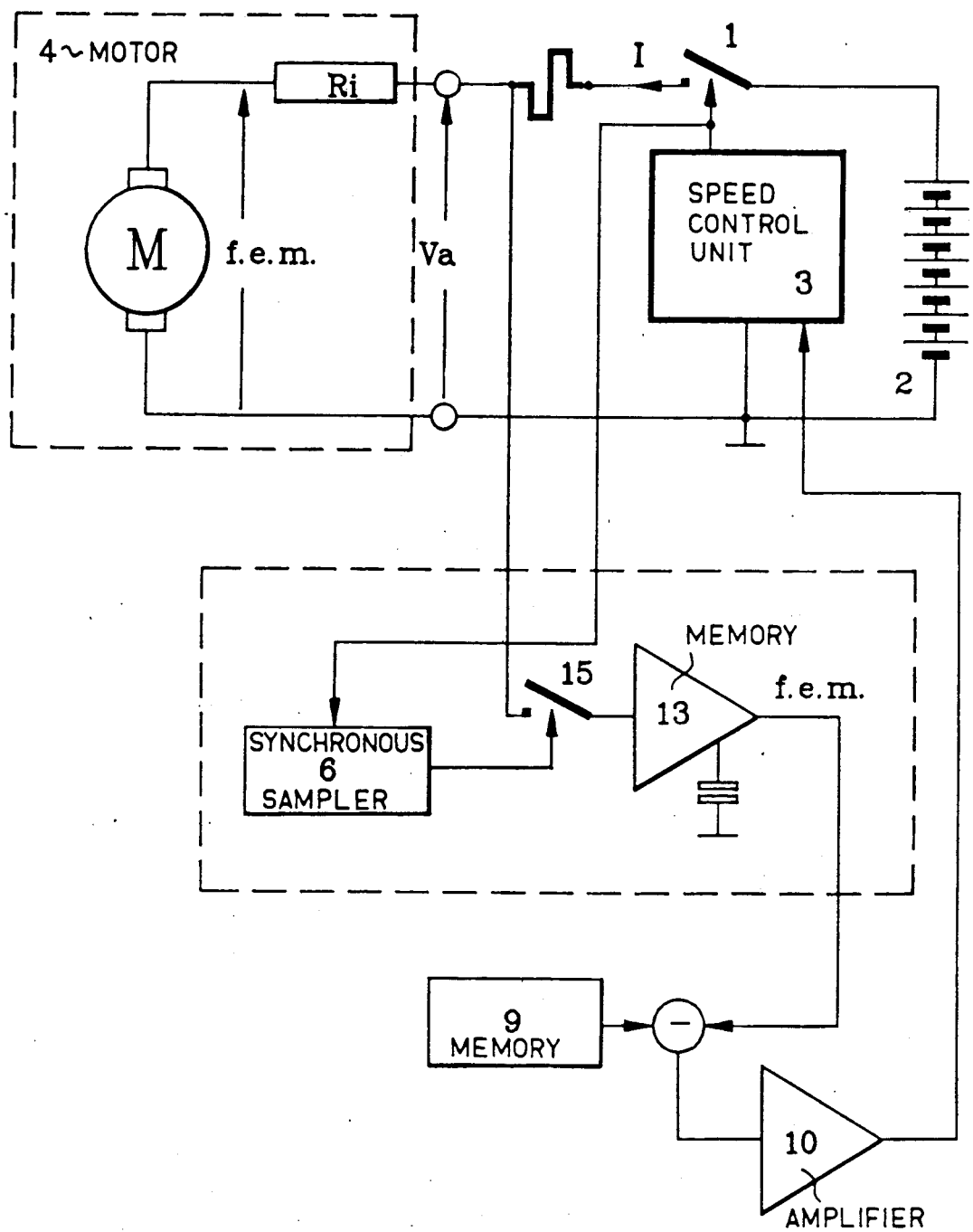
FIG. 2 shows an electric circuit according to a second embodiment.

FIG. 2 shows the circuit comprising motor 4, supply 2 and feed control unit 3, connected to the circuit relative to a further embodiment. In fact, a synchronous current sampler 6 is foreseen which defines the instants when the current reaches the zero value. Said sampler acts on switch 15 that enables memory 13 to store the value of the electromotive force (e.m.f.) in the instants when the current reaches the zero value. In this case the equation is: Va = e.f.m. The signal given by this e.m.f. is used to display the speed of rotation v that is proportional to the e.m.f. This is also compared to a reference e.m.f. in memory 9. The difference between the two values is amplified by amplifier 10 that acts on control unit 3.

Memory 13 can in particular be an integrator.

Figure 3:
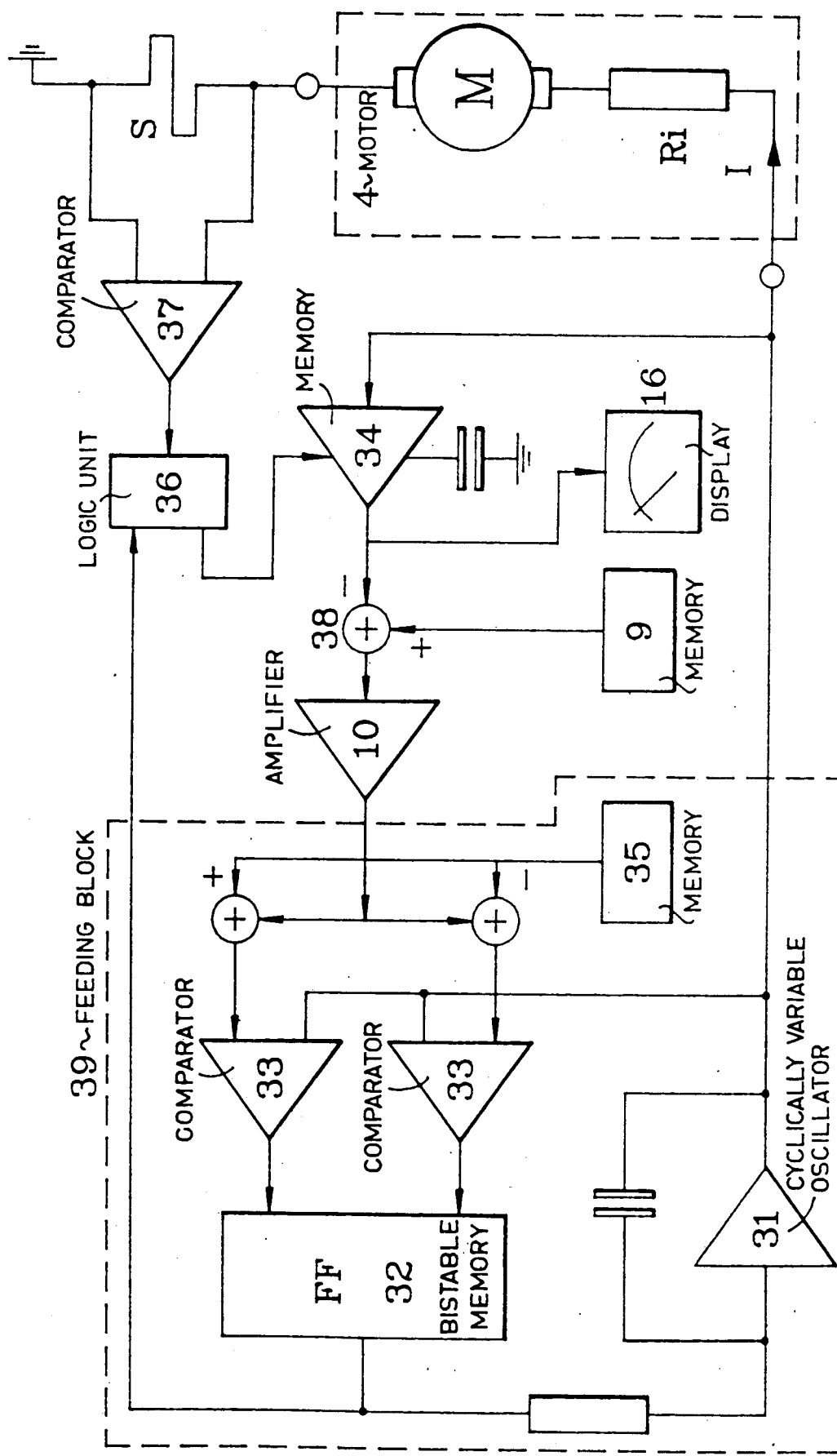
FIG. 3 shows an electric circuit according to a third embodiment.

FIG. 3 shows a circuit comprising motor 4, having armature resistance Ri, a shunt S measuring the current I, a comparator 37 which detects the instants in which the current reaches the zero value and, through the logic unit 36, enables the memory 34 to store the e.m.f. values. These values, in those instants, are equal to the voltage Va. Memory 34 can in particular be an integrator.

An exemplary embodiment of the logic unit 36 is shown in FIG. 3. It comprises:
three pulse shapes (40)
two multiplexers (41)
one squarer (42)
one missing pulses detector (43)
which are connected as shown in the figure.

Referring again to FIG. 3, it shows also a display 16 at the outlet of memory 34 showing the rotational speed of the motor.

As in previously described embodiments, the e.m.f. value stored in memory 34 is compared with the reference value carried in memory 9 in adder 38. The error, aplified by amplifier 10, is used to drive the feed control unit 39.

Feeding block 39 comprises the cyclically variable oscillator 31, connected to bistable memory 32, and then to comparators 33 and to memory storing the Delta V reference value 35. Feeding block 39, driven, as already said, by amplifier 10, maintains the oscillator 31 output voltage centered upon the motor e.m.f. value and reduces its oscillation amplitude within the predetermined range.

If the current (I) does not reach the zero value during one or more cycles, due to a too rapid current transient, logic unit 36 generates sampling signals, corresponding to those instants in which the output voltage of the oscillator (31) is at its highest or lowest value, according to the current (I) sign detected by the comparator (37). Said sampling signals enable the memory (34) to store the highest voltage output value, when the current (I) is negative, and the lowest voltage output value, when the current (I) is positive.

Figure 4:
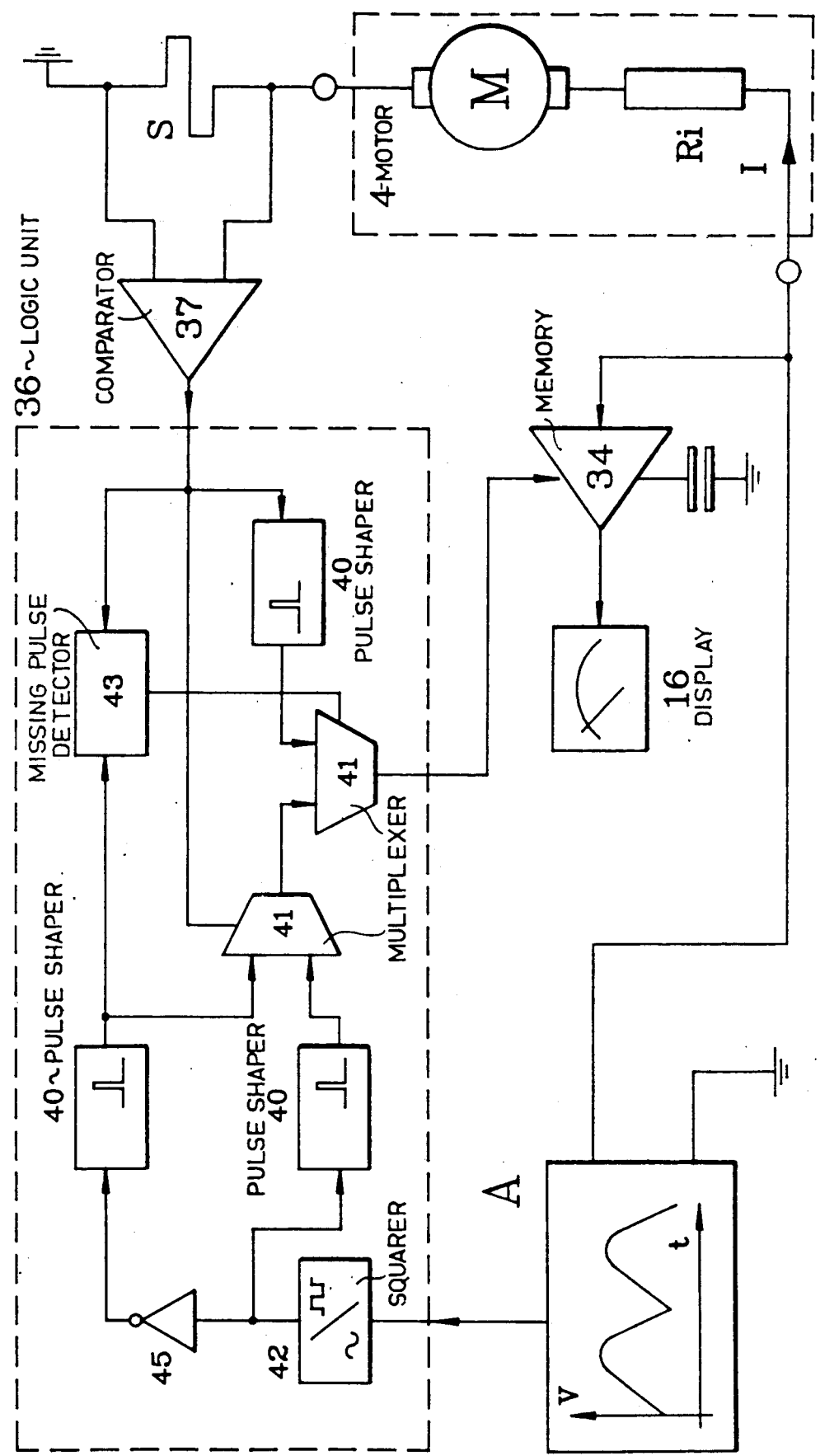
FIG. 4 shows the speed measurement and visualisation apparatus, already described in FIG. 3.

FIG. 4 shows the motor speed measurement and displaying apparatus. The motor is considered to be fed with a variable voltage by a feeder A. The identifiying numbers of the various blocks and related functions are the same already detailed in FIG. 3.

I claim:

1. Speed control process for direct current motor fed by a d.c. voltage power source according to which e.m.f. = V − Ri is calculated as the difference between a terminal voltage Va and a voltage drop at a reference resistor through which an armature current flows, then this value is used as a velocity feedback signal for motor regulation, said process comprising cyclically measuring said terminal voltage Va at two successive close instants t1 and t2 during which armature resistance and the motor e.m.f. can be considered constant, and storing these terminal voltage values $Va_{t1}$, $Va_{t2}$ in a memory, then using these terminal voltage values to determine an actual armature resistance during the interval t1−t2, then multiplying this value to obtain an instant current, and subtracting the result from the terminal voltage Va and only thereafter using the resulting e.m.f. as a velocity feedback signal for the velocity feedback circuit.

2. The speed control process according to claim 1, further comprising superimposing the direct voltage feeding the motor on a cyclically variable voltage term, with the resulting cyclically variable voltage being comprised within a range including the e.m.f. value, in which the e.m.f. is measured at least two instants per cycle at which the current reaches a zero value, by measuring corresponding terminal voltage values Va, according to the equation:

$$e.m.f. = Va.$$

3. The speed control process according to claim 1, wherein, if the current value does not reach a zero value during at least one cycle, a logic unit generates sampling signals directed to the memory which was previously storing an expected e.m.f. value, said signals corresponding to those instants at which the output voltage of an oscillator is at its highest or lowest value, so that, according to a current sign detected by a comparator, the memory stores the highest output voltage when the current sign is negative and the lowest output voltage when the current sign is positive.

4. A speed control unit for a d.c. motor fed by a direct voltage power source comprising a resistor through which an armature current flows, a voltage divider for measuring terminal voltage Va, so that a velocity feedback signal can be sent to a control circuit comprising means for storing a reference speed, an adder for comparing a value representative of this reference speed with the feedback value, an amplifier for amplifying the difference between the two values which is used to operate the speed control unit, a logic unit through which the velocity feedback signal is caused to pass before being sent to the control circuit, said logic unit being adapted to store the terminal voltage values obtained at two successive close instants t1 and t2 during which the armature resistance and the motor e.m.f. can be considered constant, means for calculating actual armature resistance according to the equation e.m.f.=V−Ri and multiplying this value by the instant current, means for subtracting the result from the terminal voltage to produce a corrected signal, and means for sending the corrected signal to the speed control circuit.

5. The speed control unit according to claim 4, further comprising a synchronous sampler or a comparator for identifying instants at which the current reaches a zero value, and a second memory storing the values of the terminal voltage Va at said instants.

6. The speed control unit according to claim 4, wherein the memory storing the e.m.f. value is an integrator.

7. The speed control unit according to claim 4, wherein the motor feed control unit comprises a cyclically variable feeder generating a voltage cycle which is superimposed on the direct voltage produced by the motor power source, said voltage cycle having an amplitude chosen so that the variable voltage resulting from superposition comprises the actual value of the e.m.f.

8. The speed control unit according to claim 7, wherein the cyclically variable feeder is an oscillator.

9. The speed control unit according to claim 8, wherein the motor feed control unit further comprises comparators, a bistable memory, and a further memory storing a reference ΔV value for keeping an output voltage of the oscillator centered on the stored e.m.f. value, and within a preset oscillation range.

* * * * *